(12) United States Patent
Tyagi et al.

(10) Patent No.: US 12,307,353 B2
(45) Date of Patent: May 20, 2025

(54) RADAR SYSTEM USING A MACHINE-LEARNED MODEL FOR STATIONARY OBJECT DETECTION

(71) Applicant: Aptiv Technologies AG, Schaffhausen (CH)

(72) Inventors: Kanishka Tyagi, Agoura Hills, CA (US); Yihang Zhang, Calabasas, CA (US); John Kirkwood, Playa del Rey, CA (US); Shan Zhang, Thousand Oaks, CA (US); Sanling Song, Northport, AL (US); Narbik Manukian, Los Angeles, CA (US)

(73) Assignee: Aptiv Technologies AG, Schaffhausen (CH)

(*) Notice: Subject to any disclaimer, the term of this patent is extended or adjusted under 35 U.S.C. 154(b) by 1005 days.

(21) Appl. No.: 17/230,877

(22) Filed: Apr. 14, 2021

(65) Prior Publication Data

US 2022/0335279 A1    Oct. 20, 2022

(51) Int. Cl.
*G06N 3/06* (2006.01)
*G01S 13/931* (2020.01)
(Continued)

(52) U.S. Cl.
CPC .......... *G06N 3/063* (2013.01); *G01S 13/931* (2013.01); *G06N 3/08* (2013.01); *G06N 20/00* (2019.01); *G01S 2013/93271* (2020.01)

(58) Field of Classification Search
CPC .......... G06N 3/063; G06N 20/00; G06N 3/08; G01S 13/931; G01S 2013/93271
(Continued)

(56) References Cited

U.S. PATENT DOCUMENTS 6,300,865 B1 * 10/2001 Fechner ............... G05D 1/0257
340/436
10,710,119 B2    7/2020 Kumar et al.
(Continued)

FOREIGN PATENT DOCUMENTS

DE    19720764 A1    11/1997
EP    3614302 A1    2/2020
(Continued)

OTHER PUBLICATIONS

"Extended European Search Report", EP Application No. 22159819.6, Sep. 9, 2022, 16 pages.
(Continued)

*Primary Examiner* — James R Hulka
*Assistant Examiner* — Samarina Makhdoom
(74) *Attorney, Agent, or Firm* — Harness, Dickey & Pierce, P.L.C.

(57) ABSTRACT

This document describes techniques and systems related to a radar system using a machine-learned model for stationary object detection. The radar system includes a processor that can receive radar data as time-series frames associated with electromagnetic (EM) energy. The processor uses the radar data to generate a range-time map of the EM energy that is input to a machine-learned model. The machine-learned model can receive as inputs extracted features corresponding to the stationary objects from the range-time map for multiple range bins at each of the time-series frames. In this way,
(Continued)

the described radar system and techniques can accurately detect stationary objects of various sizes and extract critical features corresponding to the stationary objects.

14 Claims, 6 Drawing Sheets

(51) Int. Cl.
- *G06N 3/063* (2023.01)
- *G06N 3/08* (2023.01)
- *G06N 20/00* (2019.01)

(58) Field of Classification Search
USPC .......................................................... 342/84
See application file for complete search history.

(56) References Cited

U.S. PATENT DOCUMENTS

| | | | |
|---|---|---|---|
| 10,816,993 B1* | 10/2020 | Tran | G05D 1/0246 |
| 2019/0384318 A1* | 12/2019 | Fuchs | G01S 13/86 |
| 2020/0064436 A1* | 2/2020 | Dang | G01S 5/0294 |
| 2020/0142421 A1* | 5/2020 | Palanisamy | G06N 3/08 |
| 2020/0250473 A1* | 8/2020 | Elluswamy | G16Y 20/10 |
| 2021/0011147 A1* | 1/2021 | Va | G01S 7/415 |
| 2021/0346916 A1 | 11/2021 | Kumar et al. | |

FOREIGN PATENT DOCUMENTS

| | | |
|---|---|---|
| EP | 3767332 A1 | 1/2021 |
| EP | 3882654 A1 | 9/2021 |
| EP | 4024077 A1 | 7/2022 |

OTHER PUBLICATIONS

Akita, et al., "Object Tracking and Classification Using Millimeter-Wave Radar Based on LSTM", 2019 IEEE Intelligent Transportation Systems Conference (ITSC), Oct. 2019, pp. 1110-1115.

Patel, et al., "Deep Learning-based Object Classification on Automotive Radar Spectra", 2019 IEEE Radar Conference (RadarConf), Apr. 2019, 6 pages.

Zhang, et al. "Fusion of Deep Neural Networks for Activity Recognition: A Regular Vine Copula Based Approach", Nov. 21, 2019, 7 pages.

"Extended European Search Report", EP Application No. 22207961.8, Aug. 21, 2023, 9 pages.

Shirakata, et al., "Object and Direction Classification based on Range-Doppler Map of 79 GHz MIMO Radar Using a Convolutional Neural Network", 2019 12th Global Symposium on Millimeter Waves (GSMM), May 22, 2019, 3 pages.

\* cited by examiner

RADAR SYSTEM USING A MACHINE-LEARNED MODEL FOR STATIONARY OBJECT DETECTION

BACKGROUND

Many vehicles use radar systems to detect stationary objects. Some radar systems use a point-cloud representation of radar data to detect stationary objects. The point-cloud data is often combined with data from other sensors (e.g., camera or lidar systems) to detect stationary objects more-accurately. When driving down a road, such systems may detect relatively large stationary objects (e.g., a parked vehicle) but struggle to detect smaller stationary objects with sufficient accuracy and speed to be relied on for autonomous or semi-autonomous control. Even if detected, these systems may fail to identify essential features (e.g., range, angle, geometrical features, intensity-based features, distinction from a guardrail) about approaching, stationary objects, which can cause an erratic or unintended vehicle-behavior.

SUMMARY

This document describes techniques and systems related to a radar system using a machine-learned model for stationary object detection. The radar system includes a processor that can receive radar data as time-series frames associated with electromagnetic (EM) energy. The processor uses the radar data to generate a range-time map of the EM energy that is input to a machine-learned model. The machine-learned model can receive as inputs extracted features corresponding to the stationary objects from the range-time map for multiple range bins at each of the time-series frames. In this way, the described radar system and techniques can accurately detect stationary objects of various sizes and extract critical features corresponding to the stationary objects.

This document also describes methods performed by the above-summarized techniques and components and other configurations of the radar system set forth herein, as well as means for performing these methods.

This Summary introduces simplified concepts related to a radar system that uses a machine-learned model for stationary object detection, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a radar system using a machine-learned model for stationary object detection are described in this document with reference to the following figures. The same numbers are often used throughout the drawings to reference like features and components.

DETAILED DESCRIPTION

Overview

Radar systems can be configured as an important sensing technology that vehicle-based systems rely on to acquire information about the surrounding environment. For example, vehicle-based systems can use radar systems to detect stationary objects in or near a roadway and, if necessary, take necessary actions (e.g., reducing speed, changing lanes) to avoid a collision. Radar systems generally use a point-cloud representation of radar data (e.g., detection-level data) to detect objects such as this. From a moving vehicle, such systems can generally detect relatively large stationary objects, such as parked vehicles, but often cannot detect smaller stationary objects while the vehicle is not stationary and driving at speed. If the host vehicle travels at a non-uniform speed, these radar systems may also struggle to differentiate stationary objects from moving objects.

Radar systems generally process radar data as a series of frames collected at equal time intervals. To pre-process, label, and extract features from the radar data, these radar systems use the speed of the host vehicle to track and associate stationary objects. Due to changing vehicle speed, the vehicle displacement in each frame is different. The changing vehicle speed can make it difficult for these radar systems to detect and label stationary objects accurately.

To improve the accuracy and speed with which even small stationary objects are detected by radar, this document describes techniques and systems for a machine-learned model that a radar system can use for stationary object detection based on low-level radar data. Low-level radar data (e.g., range-Doppler maps, range-azimuth maps, Doppler-azimuth maps) provide more information than point cloud representations. By using low-level radar data, the described machine-learned model can accurately detect stationary objects of various sizes and identify stationary objects sooner.

The described techniques and systems can also interpolate the low-level radar data so that each frame is normalized based on the vehicle speed. In this way, an interpolated range-time map represents a potential detection of a stationary object as a straight 45-degree line. The interpolated range-time map simplifies stationary object detection, improving its accuracy and confidence.

This is just one example of the described techniques and systems for a radar system to use a machine-learned model for stationary object detection. This document describes other examples and implementations.

Operating Environment

Figure 1:
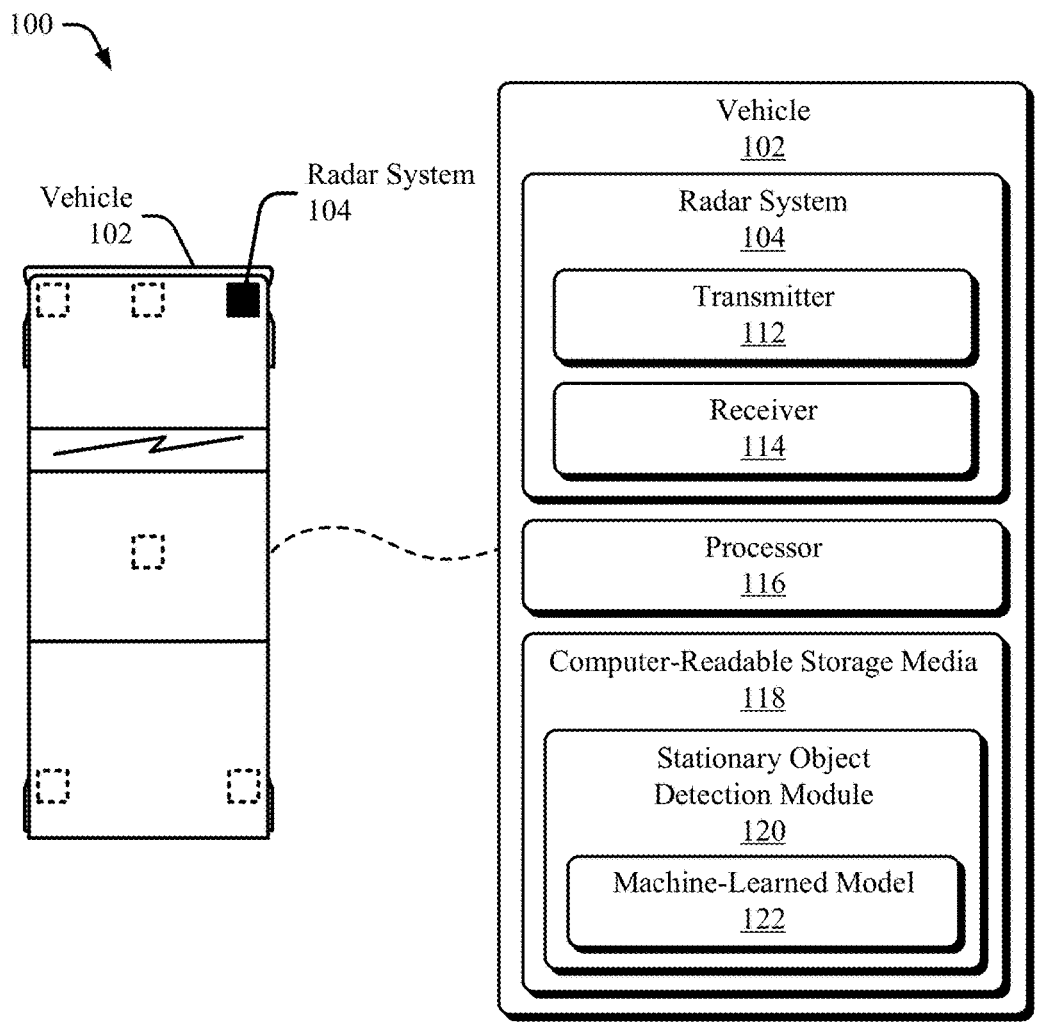
FIG. 1 illustrates an example environment in which a radar system can use a machine-learned model for stationary object detection, in accordance with techniques of this disclosure.
Figure 1:
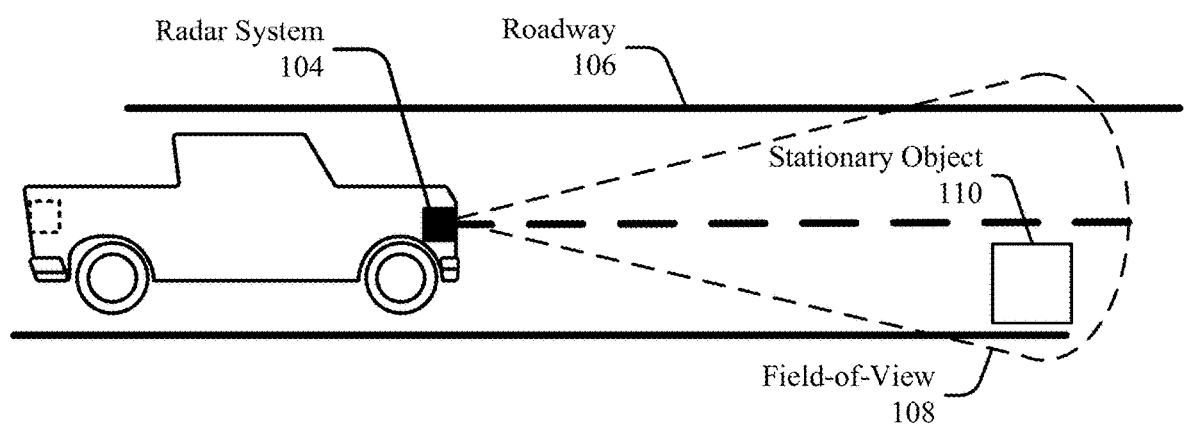

FIG. 1 illustrates an example environment 100 in which a radar system uses a machine-learned model for stationary object detection in accordance with techniques of this disclosure. In the depicted environment 100, the radar system 104 is mounted to, or integrated within, a vehicle 102 traveling on a roadway 106. Within a field-of-view 108, the radar system 104 can detect one or more stationary objects 110 near the vehicle 102.

Although illustrated as a truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 104 to any moving platform, including moving machinery or robotic equipment.

In the depicted implementation, the radar system 104 is mounted on the front of the vehicle 102 and illuminates the stationary object 110. The radar system 104 can detect the stationary object 110 from any exterior surface of the vehicle 102. For example, vehicle manufacturers can integrate, install, or attach the radar system 104 into a front portion, bumper, side mirror, headlights, rear lights, or any other interior or exterior location where the stationary object 110 requires detection. In some cases, the vehicle 102 includes multiple radar systems 104, such as a first radar system 104 and a second radar system 104, that provide a larger instrument field-of-view 108. In general, vehicle manufacturers can design the locations of one or more radar systems 104 to provide a particular field-of-view 108 that encompasses a region of interest. Example fields-of-view 108 include a 360-degree field-of-view, one or more 180-degree fields-of-view, one or more 90-degree fields-of-view, and so forth, which can overlap into the field-of-view 108 of a particular size.

The stationary object 110 includes one or more materials that reflect radar signals. Depending on the application, the stationary object 110 can represent a target of interest. For example, the stationary object 110 can be a parked vehicle, a roadside sign, a roadway barrier, or debris on the roadway 106.

The radar system 104 emits electromagnetic (EM) radiation by transmitting EM signals or waveforms via antenna elements. In the environment 100, the radar system 104 can detect and track the stationary object 110 by transmitting and receiving one or more radar signals. For example, the radar system 104 can transmit EM signals between 100 and 400 gigahertz (GHz), between 4 and 100 GHz, or between approximately 70 and 80 GHz.

The radar system 104 can include a transmitter 112, which includes at least one antenna to transmit EM signals. The radar system 104 can also include a receiver 114, which includes at least one antenna to receive reflected versions of the EM signals. The transmitter 112 includes one or more components for emitting the EM signals. The receiver 114 includes one or more components for detecting the reflected EM signals. Manufacturers can incorporate the transmitter 112 and the receiver 114 together on the same integrated circuit (e.g., configured as a transceiver) or separately on different integrated circuits.

The radar system 104 also includes one or more processors 116 (e.g., an energy processing unit) and computer-readable storage media (CRM) 118. The processor 116 can be a microprocessor or a system-on-chip. The processor 116 can execute computer-executable instructions stored in the CRM 118. For example, the processor 116 can process EM energy received by the receiver 114 and determine, using a stationary object detection module 120, a location of the stationary object 110 relative to the radar system 104. The stationary object detection module 120 can also detect various features (e.g., range, target angle, velocity) of the stationary object 110.

The processor 116 can also generate radar data for at least one automotive system. For example, the processor 116 can control, based on processed EM energy from the receiver 114, an autonomous or semi-autonomous driving system of the vehicle 102. For example, the autonomous driving system can control operation of the vehicle 102 to maneuver around the stationary object 110 or to slow down or come to a stop to avoid a collision with the stationary object 110. As another example, the semi-autonomous driving system can alert an operator of the vehicle 102 that the stationary object 110 is in the roadway 106.

The stationary object detection module 120 receives radar data, for example, raw or time-series frames associated with EM energy received by the receiver 114, and determines whether a stationary object 110 is in the roadway 106 and various features associated with the stationary object 110. The stationary object detection module 120 can use a machine-learned model 122 to assist with the described operations and functions. The radar system 104 can implement the stationary object detection module 120 and the machine-learned model 122 as computer-executable instructions in the CRM 118, hardware, software, or a combination thereof that is executed by the processor 116.

The machine-learned model 122 can perform, using input range-time maps and extracted features, stationary object detection for the stationary objects 110. The machine-learned model 122 can use a neural network (e.g., long short-term memory (LSTM) network) to detect the stationary objects 110. The machine-learned model 122 is trained to receive the range-time maps and extracted features to perform stationary object detection. The output of the machine-learned model 122 can include an identification of the stationary objects 110.

The machine-learned model 122 can be or include one or more various types of machine-learned models. The machine-learned model 122 can perform classification, clustering, tracing, and/or other tasks in some implementations. For classifications, the machine-learned model 122 can be trained using supervised learning techniques. For example, the stationary object detection module 120 can train the machine-learned model 122 with training data (e.g., truth data) that includes range-time maps and extracted features corresponding to stationary objects with example detected objects labeled as stationary (or not stationary). The labels can be manually applied by engineers or provided by other techniques (e.g., based on data from other sensor systems). The training dataset can include range-time maps similar to those input to the machine-learned model 122 during operation of the vehicle 102.

The machine-learned model 122 can be trained offline, e.g., at a training computing system and then provided for storage and implementation at one or more computing devices. For example, the training computing system can include a model trainer. The training computing system can be included in or separate from the computing device that implements the machine-learned model 122. The training of the machine-learned model 122 is described in greater detail with respect to FIG. 5.

In some implementations, the machine-learned model 122 can be or include one or more artificial neural networks. A neural network can include a group of connected nodes organized into one or more layers. Neural networks that include multiple layers can be referred to as deep networks. A deep network can include an input layer, an output layer, and one or more hidden layers positioned between the input and output layers. The nodes of the neural network can be connected or non-fully connected.

In other implementations, the machine-learned model 122 can be or include one or more recurrent neural networks. In some instances, at least some of the nodes of a recurrent neural network can form a cycle. Recurrent neural networks (e.g., a LSTM network with multiple layers) can be especially useful for processing input data that is sequential in nature (e.g., a series of frames in radar data). In particular, a recurrent neural network can pass or retain information from a previous portion of the input data sequence (e.g., an initial frame) to a subsequent portion of the input data sequence (e.g., a subsequent frame) through the use of recurrent or directed cyclical node connections.

By using low-level radar data, the radar system 104 and the stationary object detection module 120 can extract more information about the EM energy distribution across the range, Doppler, azimuth-angle, and elevation-angle dimensions than is possible using radar data in a compressed data cube (CDC) format. In addition to range, angle, and Doppler features regarding the stationary objects 110, the low-level radar data allows the stationary object detection module 120 to capture intensity-based or geometrical features for the stationary objects 110.

For example, FIG. 1 illustrates the vehicle 102 traveling on the roadway 106. The radar system 104 detects the stationary object 110. The radar system 104 can also track the stationary object 110 and extract features associated with it. As described above, the vehicle 102 can also include at least one automotive system that relies on data from the radar system 104, such as a driver-assistance system, an autonomous-driving system, or a semi-autonomous-driving system. The radar system 104 can include an interface to an automotive system that relies on the data. For example, the processor 116 outputs, via the interface, a signal based on EM energy received by the receiver 114.

Generally, the automotive systems use radar data provided by the radar system 104 to perform a function. For example, the driver-assistance system can provide blind-spot monitoring and generate an alert that indicates a potential collision with the stationary object 110. The radar data can also indicate when it is safe or unsafe to change lanes. The autonomous-driving system may move the vehicle 102 to a particular location on the roadway 106 while avoiding collisions with the stationary object 110. The radar data provided by the radar system 104 can also provide information about a distance to and the location of the stationary object 110 to enable the autonomous-driving system to perform emergency braking, perform a lane change, or adjust the speed of the vehicle 102.

Figure 2:
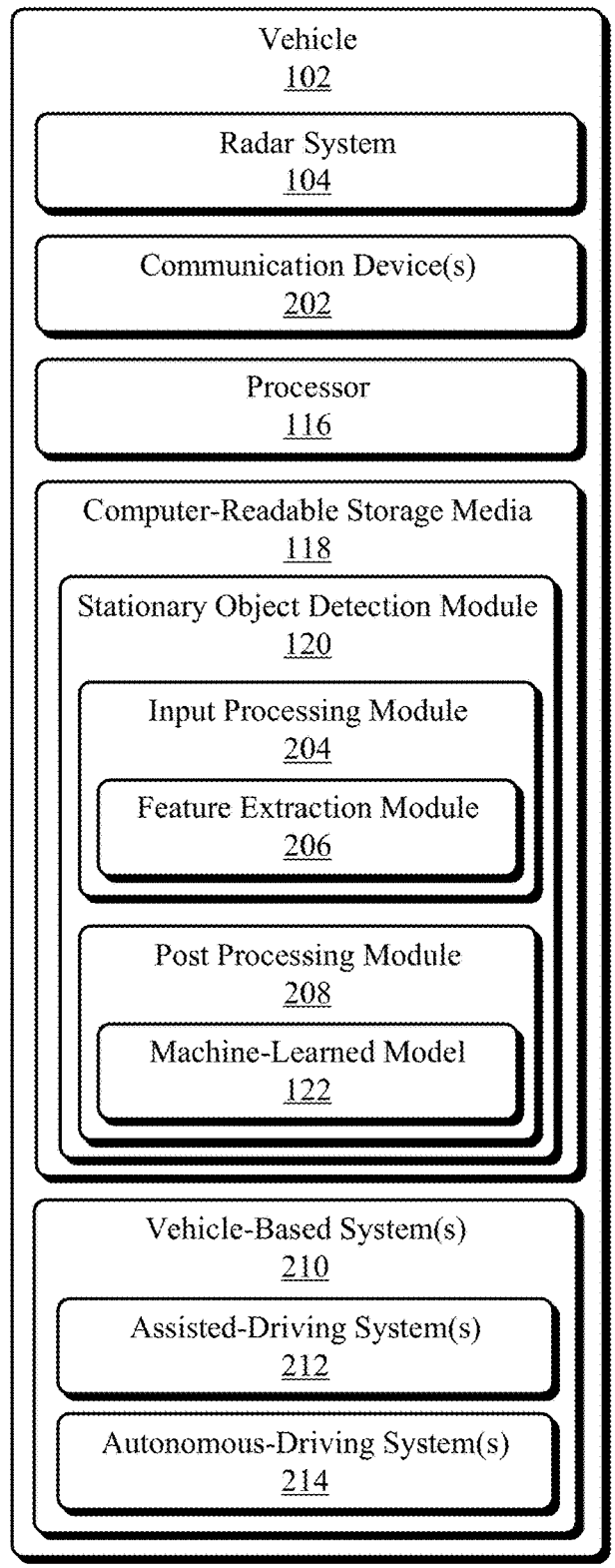
FIG. 2 illustrates an example configuration of a vehicle with a radar system that uses a machine-learned model for stationary object detection.

FIG. 2 illustrates an example configuration of the vehicle 102 with the radar system 104 that can use the machine-learned model 122 for stationary object detection. As described with respect to FIG. 1, the vehicle 102 can include the radar system 104, the processor 116, the CRM 118, the stationary object detection module 120, and the machine-learned model 122. The vehicle 102 can also include one or more communication devices 202 and one or more vehicle-based systems 210.

The communication devices 202 can include a sensor interface and a vehicle-based system interface. The sensor interface and the vehicle-based system interface can transmit data over a communication bus of the vehicle 102, for example, when the individual components of the stationary object detection module 120 are integrated within the vehicle 102.

The stationary object detection module 120 can include an input processing module 204 with a feature extraction module 206. The stationary object detection module 120 can also include a post processing module 208 with the machine-learned model 122. The input processing module 204 can receive radar data from the receiver 114 as an input. Generally, the radar data is received as low-level, time-series data. In contrast, some radar systems process the radar data from the receiver 114 as a cloud-point representation. The low-level, time-series data can be processed by the stationary object detection module 120 to provide better detection resolution and extract features associated with the stationary objects 110.

The input processing module 204 can process the radar data to generate interpolated range-angle maps, including interpolated range-azimuth maps and/or interpolated range-elevation maps. By setting the range based on a speed of the vehicle 102, the interpolated range-azimuth maps represent a potential detection of stationary objects as straight lines with a 45-degree angle. The interpolated range-azimuth format improves the accuracy of the stationary object detection module 120 by simplifying the labeling of stationary objects 110 for the machine-learned model 122.

The stationary object detection module 120 or the feature extraction module 206 can process the interpolated range-azimuth maps to generate range-time maps for the radar data. The feature extraction module 206 can input the range-time maps into the machine-learned model 122 to make stationary object predictions. The feature extraction module 206 can also perform additional processing to extract features associated with the stationary objects 110.

The post processing module 208 can perform additional processing on the stationary object predictions to remove noise. The post processing module 208 can then provide the stationary object detections to the vehicle-based systems 210.

The vehicle 102 also includes the vehicle-based systems 210, such as an assisted-driving system 212 and an autonomous-driving system 214, that rely on data from the stationary object detection module 120 to control the operation of the vehicle 102 (e.g., braking, lane changing). Generally, the vehicle-based systems 210 can use data provided by the stationary object detection module 120 to control operations of the vehicle 102 and perform certain functions. For example, the assisted-driving system 212 can alert a driver of the stationary object 110 and perform evasive maneuvers to avoid a collision with the stationary object 110. As another example, the autonomous-driving system 214 can navigate the vehicle 102 to a particular destination to avoid a collision with the stationary object 110.

Figure 3:
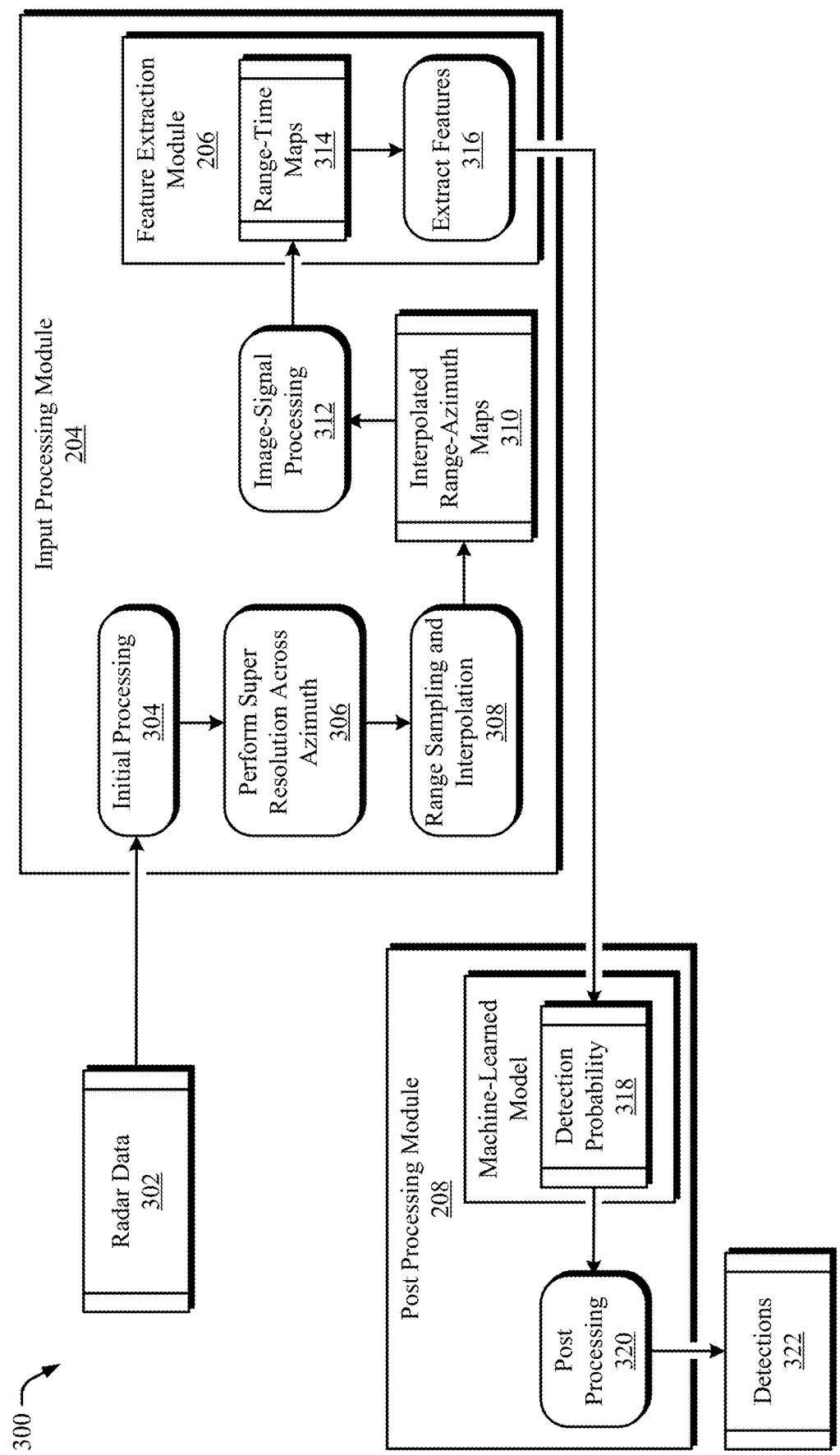
FIG. 3 illustrates an example conceptual diagram of a radar system that uses a machine-learned model for stationary object detection.

FIG. 3 illustrates an example conceptual diagram 300 of the radar system 104 that uses the machine-learned model 122 for stationary object detection. As described with respect to FIG. 2, the vehicle 102 can include the input processing module 204, the feature extraction module 206, and the post processing module 208 of the stationary object detection module 120. The conceptual diagram 300 illustrates example inputs, outputs, and operations of the stationary object detection module 120, but the stationary object detection module 120 is not necessarily limited to the order or combinations in which the inputs, outputs, and operations are shown herein. Further, any one or more of the operations may be repeated, combined, or reorganized to provide other functionality.

The radar system 104 provides time-series frames of EM energy as radar data 302 to the input processing module 204. The radar data 302 is low-level radar data that can include more information than point-cloud data, which some radar systems use for stationary object detection. Because the stationary object detection module 120 uses the radar data 302, it does not require additional input data from other sensors (e.g., a camera or lidar system) to detect stationary objects. The radar data 302 includes information associated with the stationary objects 110 in multiple dimensions, including range space, Doppler space, elevation space, and azimuth space. The radar data 302 can include beam vectors that encompass all ranges and Doppler bins. In some implementations, the stationary object detection module 120 may use only the magnitude information of the radar data 302 and not the phase information. In this way, the stationary object detection module 120 can assume that the non-zero yaw rate is not applicable to detecting stationary objects 110.

At operation 304, the input processing module 204 performs initial processing on the radar data 302. The input processing module 204 generates stationary Doppler beam vectors from the radar data 302. The beam vectors can encompass all ranges and Doppler bins and include intensity data related to nearby objects (e.g., both stationary and moving objects) fused together. The input processing module 204 performs additional processing on the beam vectors to separate the intensity data related to the various detected objects.

At operation 306, the input processing module 204 performs super resolution on the stationary Doppler beam vectors across the azimuth plane. In other implementations, the super-resolution operation can be performed across a different plane (e.g., the elevation plane). The super resolution operation can include Fourier Transforms and iterative adaptive approach (IAA). Super resolution is applied to produce azimuth and/or elevation angle data at each range bin by collapsing the Doppler dimension. For stationary objects, the stationary object detection module 120 focuses on the range-azimuth spectrums, and the input processing module 204 generates range-angle maps, including range-azimuth maps and/or range-elevation maps, of the radar data for each time frame.

Consider that the stationary object detection module 120 processes a series of range-azimuth maps collected at different times (e.g., successive time frames) by the radar system 104. In general, object-detection algorithms work best when the host vehicle (e.g., the vehicle 102) and each stationary object (e.g., the stationary object 110) move a constant range (e.g., distance) relative to one another in between data captures. Although data captures are generally equally spaced in time, the host vehicle and stationary objects are not always equally spaced in range because the vehicle velocity can vary among data captures.

At operation 308, the input processing module 204 performs range sampling and interpolation on the range-azimuth maps. The input processing module 204 can create a set of looks— one for each range bin through which the vehicle 102 moves by interpolating the actual data captures or time frames. For a given range bin, the input processing module 204 can generate an interpolated time frame by determining the time at which the vehicle reaches the range bin (e.g., "the range-bin time"). The input processing module 204 then selects data captures with time frames that bracket the range-bin time (e.g., "the bracket data captures"). The range position of the vehicle 102 is determined at the bracket data captures. The input processing module 204 then shifts the bracket data captures in the range dimension so that the location of the vehicle 102 and the stationary objects 110 match those in the interpolated time frame to be generated. The intensities in the two shifted looks can be combined using a weighted average based on the relative differences between the bracket data captures and the interpolated time frame. Alternatively, a filtered intensity value (e.g., the minimum intensity value, average intensity value, or maximum intensity value) of the two bracket data captures can be used to create the interpolated time frame. This latter approach can suppress transient signals. The input processing module 204 can combine the interpolated time frame to generate interpolated range-azimuth maps 310 of the radar data.

The input processing module 204 can also perform range down-sampling before performing the interpolation operations. The range-azimuth maps can be down-sampled in range by a given factor. The input processing module 204 can, for example, perform the range down-sampling by taking a filtered intensity value (e.g., the maximum intensity, average intensity, or minimum intensity) at each azimuth point (or elevation point in different implementations) over N consecutive range bins, where N is a positive integer. In this way, the input processing module 204 effectively compresses the range-azimuth data by a factor of N in the range dimension. The range-bin size and other range-dependent variables are multiplied by a factor of N. The increased range-bin size causes the input processing module 204 to produce a factor of N fewer interpolated time frames. Coupled with the compression in range by a factor of N, the reduction in interpolated time frames by a factor of N can result in an approximately N-squared ($N^2$) decrease in run time for subsequent processing. In this way, the described operations of the stationary object detection module 120 can be performed in real-time or near real-time despite using radar data 302 or time-series frames of the received EM energy as the input. Similarly, the machine-learned model 122 can process the radar data quicker and/or have a smaller size.

At operation 312, the input processing module 204 performs image-signal processing on the interpolated range-azimuth maps 310 to generate range-time maps 314. The input processing module 204 stacks the vectors generated by the interpolated range-azimuth maps 310 to generate the range-time maps 314. Because the stationary objects 110 move one range bin for each interpolated time frame, the interpolation causes potential detections of the stationary objects 110 to appear as straight, 45-degree lines in the range-time maps 314. Depicting the stationary objects 110 as straight, 45-degree lines simplifies and improves the accuracy of labeling for the machine-learned model 122. The interpolation also ensures that the stationary object 110 is present at each range bin and time frame in the range-time maps 314, which also simplifies the labeling of the stationary objects 110 for the machine-learned model 122. The interpolation operation performed by the input processing module 204 also results in the detection of stationary objects being independent of the velocity of the vehicle 102. Example range-time maps generated from range-azimuth maps and interpolated range-azimuth maps are described below with respect to FIGS. 4A and 4B, respectively.

The input processing module 204 processes the range-time maps 314 to identify the stationary objects 110 from the azimuth, elevation, and range-rate dimensions and collapse the data cube along these dimensions. The data cube results in a vector of energy distribution of each potential stationary object 110 along the range dimension.

At operation 316, the feature extraction module 206 extracts, using the range-time maps 314, features of the stationary objects 110 and labels the stationary objects 110. As described in greater detail with respect to FIG. 5, similar operations can be performed to train the machine-learned model 122. Because it can be difficult to differentiate stationary objects from radar reflections received for other objects (e.g., a guardrail, moving vehicles), the feature extraction module 206 performs several steps to label and identify features associated with the stationary objects 110. The range-time maps 314 are processed using a sliding window to produce window-based range-time maps. For example, the window can include desired Doppler bins at each range bin. The window-based range-time maps are then fed into a pre-trained encoder-based feature extractor.

The machine-learned model 122 can then generate predicted detections 318 regarding the stationary objects 110. The machine-learned model 122 can use an acyclic graph model to assist with the stationary object detection. An acyclic graph model identifies and retains a trace of each stationary object 110. As a result, for a given value in a time-series signal, the time frame closer to it will have a more significant impact than time frames further away.

The machine-learned model 122 can include a convolutional neural network. The machine-learned model 122 can also use pre-trained deep learning models within the convolutional neural network to extract features and feed the extracted features into a deep sequence model (e.g., a long short-term memory (LSTM) network with multiple layers) that is trained to detect the presence of stationary objects and produce detection probabilities 318. The detection probabilities 318 provide a range-time probability map that includes predictions across each range bin and each time frame.

At operation 320, the post processing module 208 performs additional processing to smooth out (e.g., remove noise) the detection probabilities 318 by applying a smoothing function and generating detections 322. The detections 322 can include detection probabilities at each range bin for each time frame for the stationary objects 110. The smoothing function to generate the final output probability of the detections 322 at a specific range is given by Equation (1):

$$p(t) = \frac{1}{1 + \frac{e^\beta}{e^{\alpha \Sigma p(t-1)}}} \quad (1)$$

where p(t−1) represents the prediction probability of the machine-learned model 122 at each range for a set of time frames, including the present time frame; p(t) represents the output of the post processing operation 320 that is a smooth pseudo probability of an object detected at the input range; and α and β represent parameters that control the level of smoothness. For example, the post processing module 208 can set α equal to 1 and β equal to $$\frac{\alpha \times \text{time frames}}{2}.$$

The time frames are the past intensity values that are used to form the input feature set to the machine-learned model 122. The post processing module 208 can apply post processing to each frame to give a smoothed probability value for the detections 322. The probability value represents the confidence level of the detections 322.

Figure 4A:
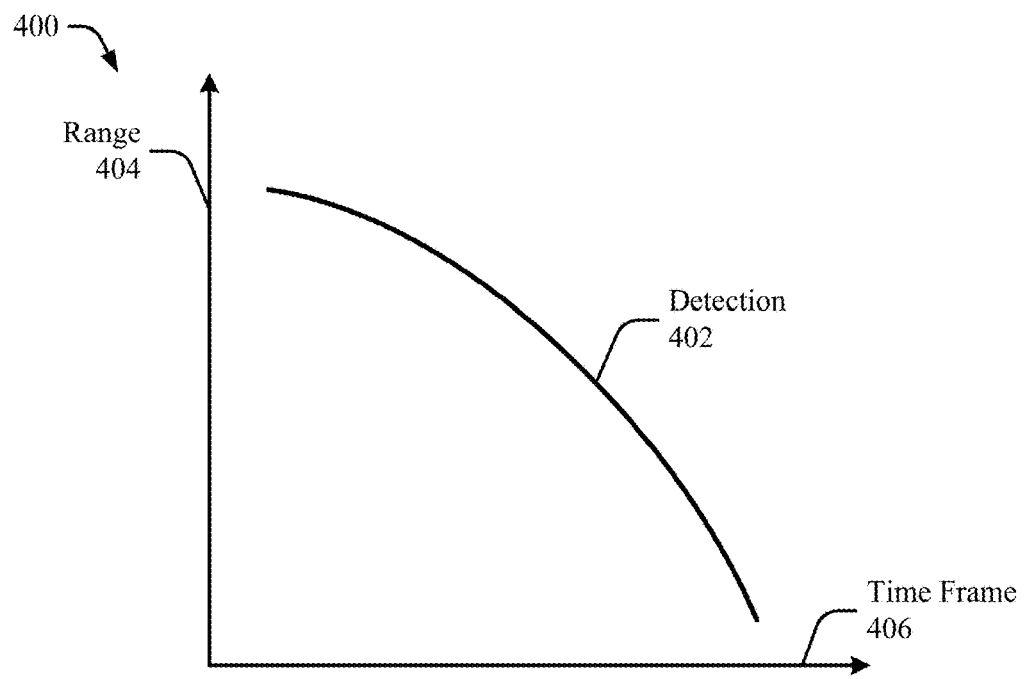
FIGS. 4A and 4B illustrate example range-time maps generated from range-azimuth maps and interpolated range-azimuth maps, respectively, for a detection of a stationary object.
Figure 4B:
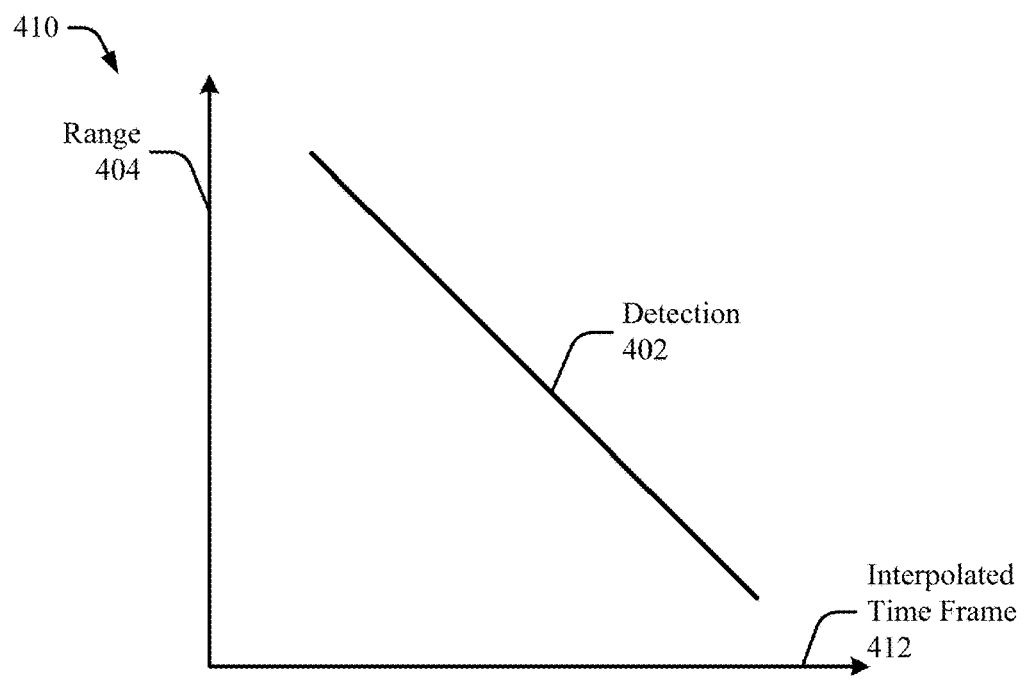

FIGS. 4A and 4B illustrate an example range-time map 400 and 410 generated from range-azimuth maps and interpolated range-azimuth maps, respectively, for a detection 402 of the stationary object 110. The maps 400 and 410 provide range 404 as the y-axis to indicate the range between the vehicle 102 and the stationary object 110.

The range-time map 400 provides time frame 406 as the x-axis to indicate the look or data capture. In contrast, the interpolated range-time map 410 provides interpolated time frame 412 as the x-axis to indicate the interpolated look. Based on the interpolation operation described with respect to FIG. 3, the interpolated frame 412 does not have a constant interval between consecutive looks. In other words, the interpolated time frame 412 is not equispaced in time.

The range-time map 400 depicts the detection 402 of the stationary object 110 as a curved line. As it approaches the stationary object 110, the vehicle 102 can experience velocity changes and the range 404 to the stationary object 110 will change non-linearly over the time frames 406. In addition, the slope of the detection 402 in the range-time map 400 will vary depending on the velocity of the vehicle 102, and changes in the slope will depend on changes in the velocity of the vehicle 102. In contrast to the range-time map 400, interpolation by the input processing module 204 causes the detection 402 of the stationary object 110 in the range-time map 410 to appear as a straight, 45-degree line because the stationary object 110 moves one range bin for each interpolated time frame 412.

Figure 5:
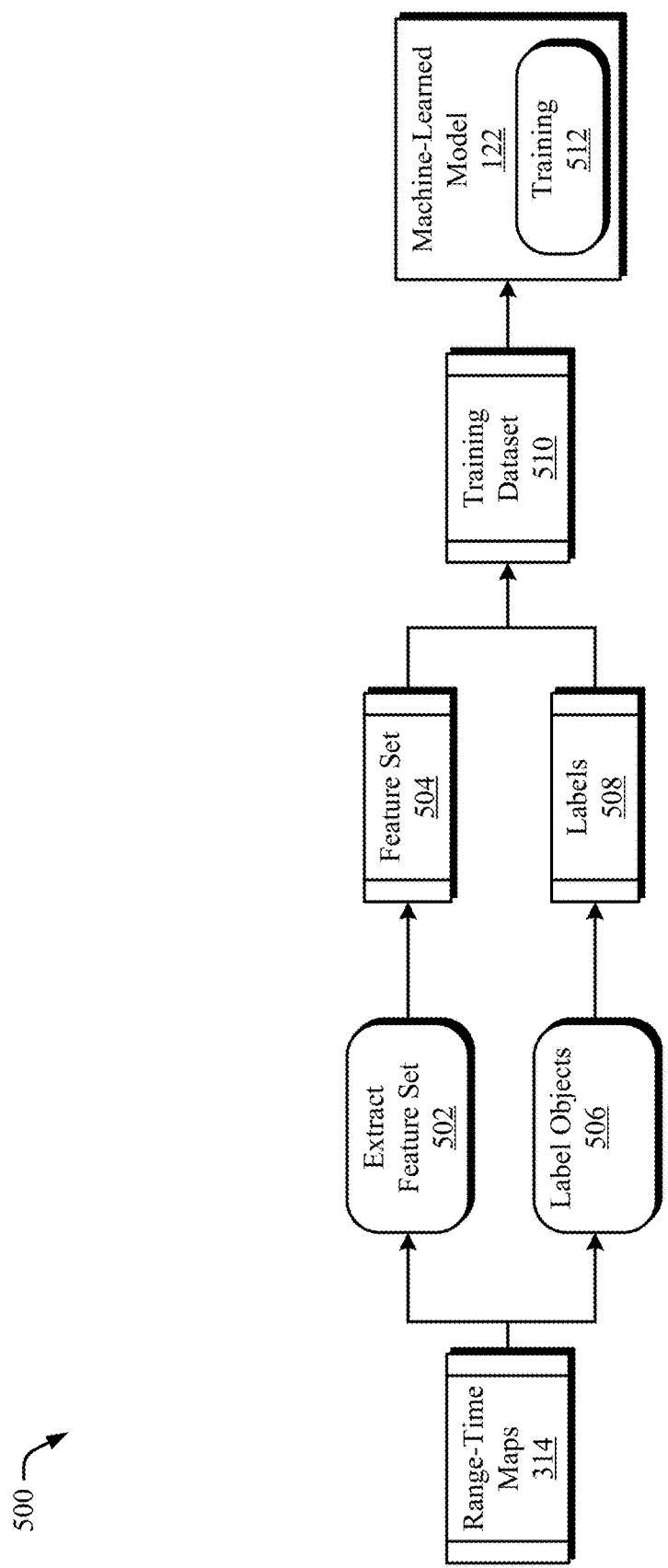
FIG. 5 illustrates an example conceptual diagram for training a machine-learned model for stationary object detection.

FIG. 5 illustrates an example conceptual diagram 500 for training the machine-learned model 122 for stationary object detection. In particular, the conceptual diagram 500 illustrates feature extraction and labeling process of the stationary object detection module 120 to train the machine-learned model 122. The conceptual diagram 500 illustrates example inputs, outputs, and operations of the stationary object detection module 120, but the stationary object detection module 120 is not necessarily limited to the order or combinations in which the inputs, outputs, and operations are shown herein. Further, any of one or more of the operations may be repeated, combined, or reorganized to provide other functionality.

At operation 502, the feature extraction module 206 extracts a feature vector from the range-time maps 314. The feature vector represents the intensity in various ranges across time frames in a range-time map. The feature extraction module 206 uses the feature vector to represent what is in the range-time map 314 and where that feature appears in a range. To determine what is in the range-time map 314, the feature extraction module 206 takes the intensity values along a 45-degree line for a specific time frame in the past and augments it with the range bin to know precisely where the target appears. By including range in the feature vector, the machine-learned model 122 can detect distant stationary objects 110 even when the target intensity is weak.

The feature set 504 is taken from a 45-degree line in the range-time map 314. Because potential detections of stationary objects in the range-time maps 314 move one range bin for each time frame and are represented by a straight 45-degree line, the feature extraction module 206 can label each stationary object 110 and non-stationary object as "1" or "0," respectively. Each target in a set of range-time maps 314 is taken through the feature extraction and labeling process to prepare a training dataset (e.g., truth data) for the machine-learned model 122.

The machine-learned model 122 can be trained offline or online. In offline training (e.g., batch learning), the machine-learned model 122 is trained on a static training data set. In online training, the machine-learned model 122 is continuously trained (or re-trained) as new training data become available (e.g., while the machine-learned model 122 is used to perform stationary object detection).

Centralized training of multiple machine-learned models 122 (e.g., based on a centrally stored dataset) may be performed. In other implementations, the trainer can use decentralized training techniques, including distributed training or federated learning, to train, update, or personalize the machine-learned model 122.

Once the training is completed, the machine-learned model 122 can be deployed in an inference stage. In the inference stage, the machine-learned model 122 can receive as input multiple range bins, including all available range bins, at each time frame of the range-time maps 314. During the inference stage, the radar data 302 is passed through the stationary object detection module 120 to generate predictions by the machine-learned model 122. In the inference stage, each input feature is multiplied with trained weights to produce a probability at each range bin and each time frame.

Example Method

Figure 6:
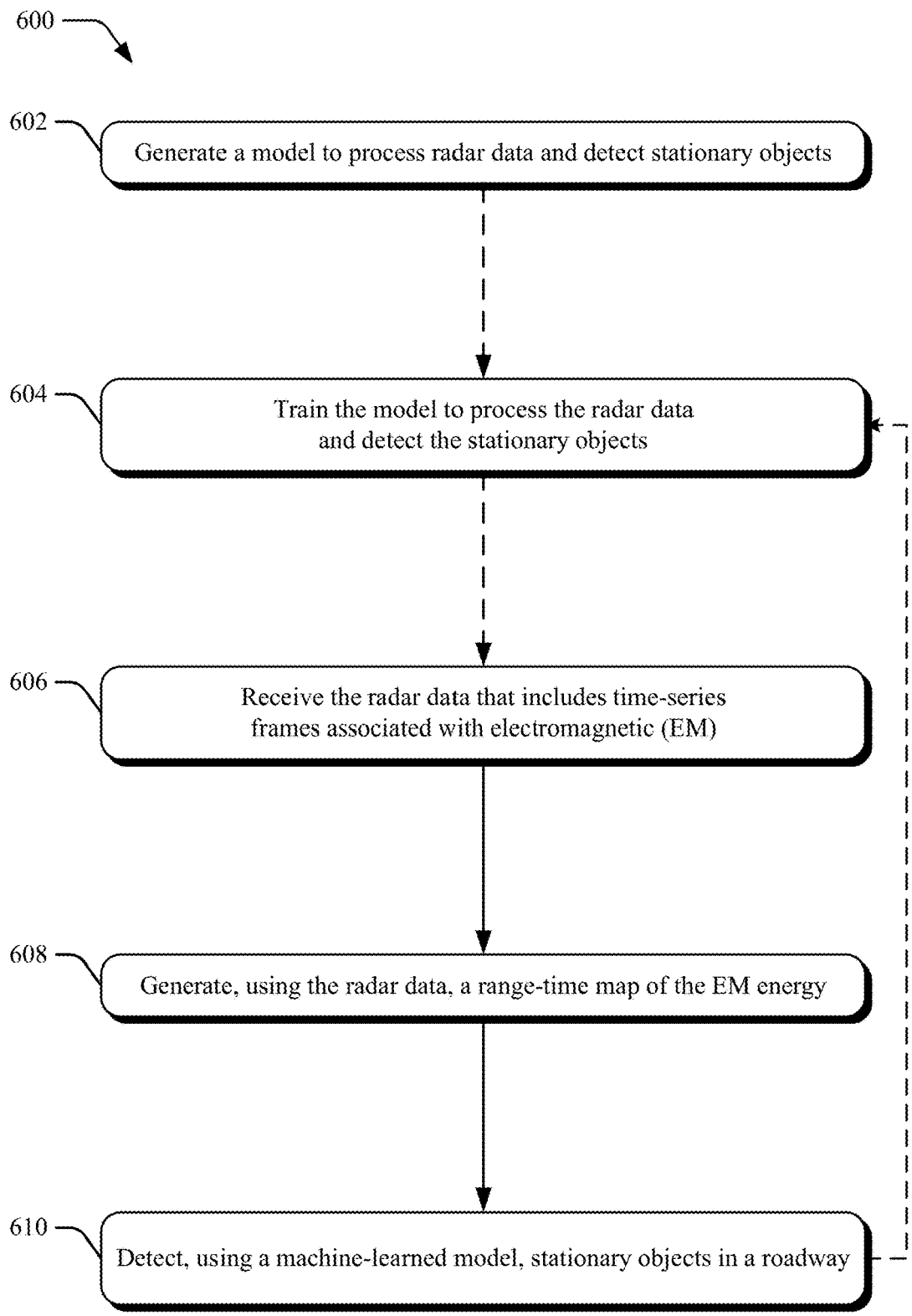
FIG. 6 illustrates a flow diagram of an example method of a radar system that uses a machine-learned model for stationary object detection in accordance with techniques of this disclosure.

FIG. 6 illustrates a flow diagram of an example method 600 of a radar system 104 that uses a machine-learned model 122 for stationary object detection. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and entities detailed in FIGS. 1 through 5, reference to which is made for example only. The techniques are not limited to performance by one entity or multiple entities.

At 602, a model is generated to process radar data and detect stationary objects. For example, a machine-learning model can be generated to process range-time maps and label stationary objects. The machine-learning model can be generated using the techniques and systems described with respect to FIGS. 1 through 5.

At 604, the model can be trained to process the radar data and detect the stationary objects. For example, the machine-learning model can be trained to process the radar data, including range-time maps, and detect and label the stationary objects 110. In addition, the machine-learning model can be trained to extract features associated with the stationary objects 110. Blocks 602 and 604 are optional operations of the method 600, which may be performed by different systems or components, at different times, and/or at different locations than blocks 606 through 610.

At 606, one or more processors of a radar system receive the radar data that includes time-series frames associated with EM energy. For example, the processor 116 of the radar system 104 receives radar data that includes time-series frames associated with the EM energy. The EM energy can be received by the receiver 114 of the radar system 104. The EM energy is the radar data 302 as described with respect to FIG. 3. The processor 116 can also process the EM energy by generating one or more Doppler beam vectors of the EM energy by using the time-series frames. The processor 116 can use the one or more Doppler beam vector and a super-resolution operation to generate a range-azimuth map of the EM energy for each of the time-series frames. Using an interpolation operation as described in greater detail with respect to FIG. 3, the processor 116 can then generate an interpolated range-azimuth map of the EM energy. Before performing the interpolation operation, the processor 116 can also down-sample the range-azimuth map in range by taking a maximum intensity at each azimuth point over a number of consecutive range bins to effectively compress the range-azimuth map.

At 608, the one or more processors generate a range-time map of the EM energy using the radar data. For example, the processor 116 processes the radar data 302 to generate the interpolated range-azimuth maps 310. The interpolated range-azimuth maps 310 can be generated after the input processing module 204 performs initial processing, super resolution across one or more planes (e.g., the azimuth plane), range sampling, and/or interpolation on the radar data 302. The input processing module 204 can then perform additional processing to generate the range-time maps 314 using the interpolated range-azimuth maps 310.

At 610, the one or more processors detect, using a machine-learned model, stationary objects. The machine-learned model is configured to input extracted features corresponding to the stationary objects from the range-time map for multiple range bins at each time frame of the radar data. For example, the processor 116 can input extracted features corresponding to the stationary objects 110 from the range-time maps 314 to the machine-learned model 122 to detect the stationary objects 110. The machine-learned model 122 can input the extracted features for multiple range bins at each time frame of the radar data. The extracted features can include range, target angle, velocity, geometrical features, and intensity-based features of the stationary objects 110.

The method 600 can return to block 604 to optionally retrain or update the machine-learned model 122 with additional truth data. For example, an implementation of the machine-learned model 122 can be updated based on additional or new truth data obtained and processed at another computing system and/or location.

EXAMPLES

In the following section, examples are provided.

Example 1: A system comprising: a radar system including one or more processors configured to detect stationary objects by: receiving radar data, the radar data comprising time-series frames associated with electromagnetic (EM) energy; generating, using the radar data, a range-time map of the EM energy; and detecting, using a machine-learned model, the stationary objects, the machine-learned model being configured to input extracted features corresponding to the stationary objects from the range time-map for multiple range bins at each of the time-series frames.

Example 2: The system of example 1, further comprising: an antenna, wherein the one or more processors are further configured to receive the radar data by processing the EM energy when received at the antenna by at least: generating, using the time-series frames, a Doppler beam vector of the EM energy; generating, using the Doppler beam vector and a super-resolution operation, a range-angle map of the EM energy for each of the time-series frames, an angle of the range-angle map including an elevation angle or an azimuth angle; and generating, using the range-angle map and an interpolation operation, an interpolated range-angle map of the EM energy.

Example 3: The system of example 2, wherein: the angle is the azimuth angle; the range-angle map is a range-azimuth map; the interpolated range-angle map is an interpolated range-azimuth map; and the range-time map represents a potential detection of a stationary object of the stationary objects as a straight, 45-degree line.

Example 4: The system of example 3, wherein the super-resolution operation can include at least one of a Fourier transform or an iterative adaptive approach to produce azimuth-angle data at each range bin.

Example 5: The system of example 3, wherein the one or more processors are configured to perform the interpolation operation by: determining, for each range bin of multiple range bins within the range-azimuth map, a range-bin time, the range-bin time being the time-series frame at which a vehicle reaches the range bin, the radar system being attached to a portion of the vehicle; selecting data captures of the radar data with time-series frames that bracket the range-bin time; determining a range position of the vehicle at the data captures that bracket the range-bin time; and shifting the data captures that bracket the range-bin time in a range dimension so that a location of the vehicle and the stationary object match those in an interpolated time-series frame.

Example 6: The system of example 5, wherein the one or more processors are configured to shift the data captures that bracket the range-bin time in the range dimension by: using a weighted average of the data captures that bracket the range-bin time, the weighted average based on relative differences between the data captures that bracket the range-bin time and the interpolated time frame; or selecting a filtered intensity value of the data captures that bracket the range-bin time.

Example 7: The system of example 3, wherein the one or more processors are further configured to process the EM energy when received at the antenna by: down-sampling the range-azimuth map in range by taking a filtered intensity at each azimuth point over a number of consecutive range bins to effectively compress the range-azimuth map.

Example 8: The system of example 7, wherein the one or more processors are further configured to process the EM energy when received at the antenna by: multiplying a range-bin size by the number to effectively reduce a number of interpolated time frames by the number.

Example 9: The system of example 1, wherein the time-series frames includes information associated with the stationary objects in multiple dimensions including at least three of a range dimension, a Doppler dimension, an elevation-angle dimension, or an azimuth-angle dimension.

Example 10: The system of example 1, wherein the extracted features include at least two of range, target angle, velocity, geometrical features, or intensity-based features of the stationary objects.

Example 11: The system of example 1, wherein: the radar system is configured to be integrated in or installed in a vehicle; and the machine-learned model comprises a long short-term memory (LSTM) network with multiple layers.

Example 12: A method comprising: receiving radar data, the radar data comprising time-series frames associated with electromagnetic (EM) energy; generating, using the radar data, a range-time map of the EM energy; and detecting, using a machine-learned model, stationary objects in a roadway, the machine-learned model being configured to input extracted features corresponding to the stationary objects from the range-time map for multiple range bins at each of the time-series frames.

Example 13: The method of example 12, the method further comprising: receiving the radar data by processing the EM energy when received at an antenna by at least: generating, using the time-series frames, a Doppler beam vector of the EM energy; generating, using the Doppler beam vector and a super-resolution operation, a range-angle map of the EM energy for each of the time-series frames, an angle of the range-angle map including an elevation angle or an azimuth angle; and generating, using the range-angle map and an interpolation operation, an interpolated range-angle map of the EM energy.

Example 14: The method of example 13, wherein: the angle is the azimuth angle; the range-angle map is a range-azimuth map; the interpolated range-angle map is an interpolated range-azimuth map; and the range-time map represents a potential detection of a stationary object of the stationary objects as a straight, 45-degree line.

Example 15: The method of example 14, wherein the interpolation operation comprises: determining, for each range bin of multiple range bins within the range-azimuth map, a range-bin time, the range-bin time being the time-series frame at which a vehicle reaches the range bin, the radar system being attached to a portion of the vehicle; selecting data captures of the radar data with time-series frames that bracket the range-bin time; determining a range position of the vehicle at the data captures that bracket the range-bin time; and shifting the data captures that bracket the range-bin time in a range dimension so that a location of the vehicle and the stationary object match those in an interpolated time-series frame.

Example 16: The method of example 15, wherein shifting the data captures that bracket the range-bin time in the range dimension comprises: using a weighted average of the data captures that bracket the range-bin time, the weighted average based on relative differences between the data captures that bracket the range-bin time and the interpolated time frame; or selecting a filtered intensity value of the data captures that bracket the range-bin time.

Example 17: The method of example 14, wherein processing the EM energy received by the antenna of the radar system further comprises: down-sampling the range-azimuth map in range by taking a filtered intensity at each azimuth point over a number of consecutive range bins to effectively compress the range-azimuth map.

Example 18: The method of example 17, wherein processing the EM energy received by the antenna of the radar system further comprises: multiplying a range-bin size by the number to effectively reduce a number of interpolated time frames by the number.

Example 19: The method of example 12, wherein the time-series frames includes information associated with the stationary objects in multiple dimensions including at least three of a range dimension, a Doppler dimension, an elevation-angle dimension, or an azimuth-angle dimension.

Example 20: A computer-readable storage media comprising computer-executable instructions that, when executed, cause a processor of a radar system to: receive radar data, the radar data comprising time-series frames associated with electromagnetic (EM) energy; generate, using the radar data, a range-time map of the EM energy; and detect, using a machine-learned model, the stationary objects, the machine-learned model being configured to input extracted features corresponding to the stationary objects from the range time-map for multiple range bins at each of the time-series frames.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A system comprising:
a radar system of a vehicle, the radar system including one or more processors configured to detect stationary objects by:
receiving radar data, the radar data comprising multiple time-series frames associated with electromagnetic (EM) energy reflected by one or more objects in a roadway and received by an antenna of the radar system, each time-series frame of the radar data including multiple range bins;
generating, using the time-series frames of the radar data, a Doppler beam vector of the EM energy;
generating, using the Doppler beam vector and a super-resolution operation, a range-azimuth map of the EM energy for each time-series frame of multiple time-series frames;
generating, using the range-azimuth map, an interpolated range-azimuth map of the EM energy by:
determining, for each range bin of multiple range bins within the range-azimuth map, a range-bin time, the range-bin time being the time-series frame at which the vehicle reaches the range bin;
selecting, for a respective range-bin time, bracketing data captures of the radar data that have a time-series frame immediately before and immediately after the respective range-bin time;
determining a range position of the vehicle at the bracketing data captures; and
shifting range values of the bracketing data captures in a range dimension so that a location of the vehicle and a stationary object among the one or more objects match those in an interpolated time-series frame;
generating, using the interpolated range-azimuth map, a range-time map of the EM energy, the range-time map representing a potential detection of the stationary object among the one or more objects as a straight, 45-degree line; and
detecting, using a machine-learned model, the stationary objects among the one or more objects, the machine-learned model being configured to receive as input extracted features corresponding to the one or more objects from the range time-map for multiple range bins at each of the time-series frames, the extracted features including at least two of range, target angle, velocity, geometrical features, or intensity-based features of the one or more objects.

2. The system of claim 1, wherein the super-resolution operation can include at least one of a Fourier transform or an iterative adaptive approach to produce azimuth-angle data at each range bin.

3. The system of claim 1, wherein the one or more processors are configured to shift the bracketing data captures in the range dimension by:
using a weighted average of the range values of the bracketing data captures, the weighted average based on relative differences between the time-series frames of the bracketing data captures and the interpolated time frame; or
selecting a filtered range value from the range values of the bracketing data captures.

4. The system of claim 1, wherein the one or more processors are further configured to process the EM energy received by the antenna by:
down-sampling the range-azimuth map in range by taking a filtered intensity at each azimuth point over a first number of consecutive range bins to effectively compress the range-azimuth map.

5. The system of claim 4, wherein the one or more processors are further configured to process the EM energy received by the antenna by:
enlarging a range-bin size of the range-azimuth map by a factor of the first number to effectively reduce a quantity of interpolated time frames by the factor of the first number.

6. The system of claim 1, wherein the time-series frames include information associated with the stationary objects in multiple dimensions including at least three of a range dimension, a Doppler dimension, an elevation-angle dimension, or an azimuth-angle dimension.

7. The system of claim 1, wherein the extracted features include at least two of range, target angle, velocity, geometrical features, or intensity-based features of the stationary objects.

8. The system of claim 1, wherein:
the machine-learned model comprises a long short-term memory (LSTM) network with multiple layers.

9. A method comprising:
receiving radar data, the radar data comprising multiple time-series frames associated with electromagnetic (EM) energy reflected by one or more objects in a roadway and received by an antenna of a radar system of a vehicle, each time-series frame of the radar data including multiple range bins;
generating, using the time-series frames of the radar data, a Doppler beam vector of the EM energy;
generating, using the Doppler beam vector and a super-resolution operation, a range-azimuth map of the EM energy for each time-series of the multiple time-series frames;
generating, using the range-azimuth map, an interpolated range-azimuth map of the EM energy by:
determining, for each range bin of multiple range bin within the range-azimuth map, a range-bin time, the range-bin time being the time-series frame at which the vehicle reaches the range bin;
selecting, for a respective range-bin time, bracketing data captures of the radar data that have a time-series frame immediately before and immediately after the respective range-bin time;
determining a range position of the vehicle at the bracketing data captures; and
shifting range values of the bracketing data captures in a range dimension so that a location of the vehicle and a stationary object among the one or more objects match those in an interpolated time-series frame;
generating, using the interpolated range-azimuth map, a range-time map of the EM energy, the range-time map representing a potential detection of the stationary object among the one or more objects as a straight, 45-degree line; and
detecting, using a machine-learned model, stationary objects in a roadway among the one or more objects, the machine-learned model being configured to receive as input extracted features corresponding to the one or more objects from the range-time map for multiple range bins at each of the time-series frames, the extracted features including at least two of range, target angle, velocity, geometrical features, or intensity-based features of the one or more objects.

10. The method of claim 9, wherein shifting the bracketing data captures in the range dimension comprises:
    using a weighted average of the range values of the bracketing data captures, the weighted average based on relative differences between the time-series frames of the bracketing data captures and the interpolated time frame; or
    selecting a filtered range value from the range values of the bracketing data captures.

11. The method of claim 9, wherein processing the EM energy received by the antenna of the radar system further comprises:
    down-sampling the range-azimuth map in range by taking a filtered intensity at each azimuth point over a first number of consecutive range bins to effectively compress the range-azimuth map.

12. The method of claim 9, wherein processing the EM energy received by the antenna of the radar system further comprises:
    enlarging a range-bin size of the range-azimuth map by a factor of the first number to effectively reduce quantity of interpolated time frames by the factor of the first number.

13. The method of claim 9, wherein the time-series frames include information associated with the stationary objects in multiple dimensions including at least three of a range dimension, a Doppler dimension, an elevation-angle dimension, or an azimuth-angle dimension.

14. A non-transitory computer-readable storage medium comprising computer-executable instructions that, when executed, cause a processor of a radar system of a vehicle to:
    receive radar data, the radar data comprising time-series frames associated with electromagnetic (EM) energy reflected by one or more objects in a roadway and received by an antenna of the radar system, each time-series frame of the radar data including multiple range bins;
    generate, using the time-series frames of the radar data, a Doppler beam vector of the EM energy;
    generate, using the Doppler beam vector and a super-resolution operation, a range-azimuth map of the EM energy for each time-series frame of the multiple time-series frames;
    generate, using the range-azimuth map, an interpolated range-azimuth map of the EM energy by:
        determining, for each range bin of multiple range bins within the range-azimuth map, a range-bin time, the range-bin time being the time-series frame at which the vehicle reaches the range bin;
        selecting, for a respective range-bin time, bracketing data captures of the radar data that have a time-series frame immediately before the immediately after the respective range-bin time;
        determining a range position of the vehicle at the bracketing data captures; and
        shifting range values of the bracketing data captures in a range dimension so that a location of the vehicle and a stationary object among the one or more objects match those in an interpolated time-series frame;
    generate, using the interpolated range-azimuth map, a range-time map of the EM energy, the range-time map representing a potential detection of the stationary object among the one or more objects as a straight, 45-degree line; and
    detect, using a machine-learned model, stationary objects among the one or more objects, the machine-learned model being configured to receive as input extracted features corresponding to the one or more objects from the range time-map for multiple range bins at each of the time-series frames, the extracted features including at least two of range, target angle, velocity, geometrical features, or intensity-based features of the one or more objects.

* * * * *